Figure 1:
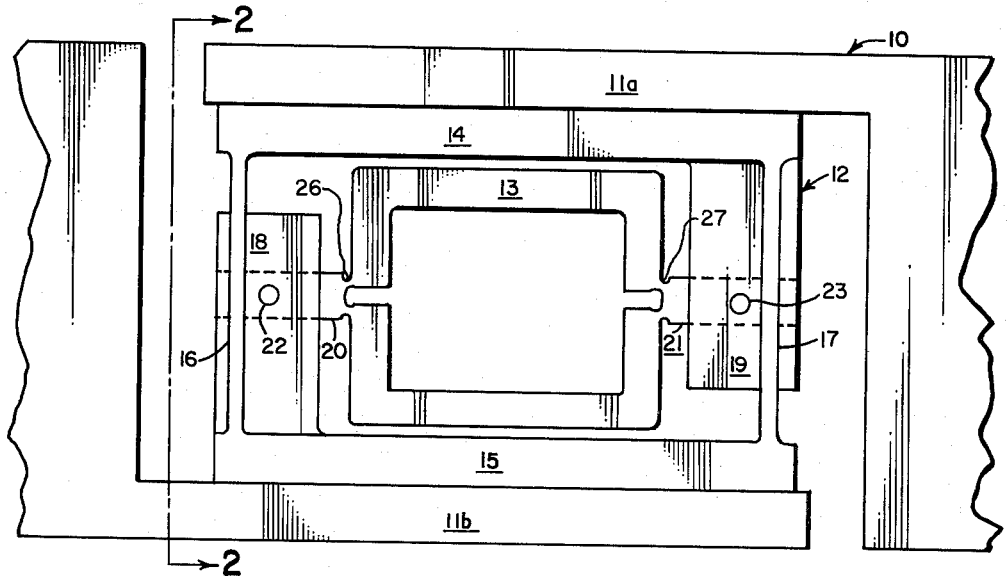

Aug. 29, 1961 S. B. MOORE 2,997,875
BALANCE FOR SENSING AXIAL FORCES
Filed Oct. 20, 1958 2 Sheets-Sheet 1

INVENTOR.
Samuel B. Moore
BY
J. N. Nichols
AGENT

Aug. 29, 1961        S. B. MOORE        2,997,875
BALANCE FOR SENSING AXIAL FORCES
Filed Oct. 20, 1958                            2 Sheets-Sheet 2

INVENTOR.
Samuel B. Moore
BY
J. K. Nichols
AGENT

United States Patent Office 2,997,875
Patented Aug. 29, 1961

2,997,875
BALANCE FOR SENSING AXIAL FORCES
Samuel B. Moore, Grand Prairie, Tex., assignor to Chance Vought Corporation, a corporation of Delaware
Filed Oct. 20, 1958, Ser. No. 768,258
4 Claims. (Cl. 73—141)

A device for sensing axial tensive and compressive forces in a member utilizing the principle of the eccentrically loaded beam is disclosed herein.

This invention, for use in a balance, relates to a force sensing element having two symmetrically positioned eccentric columns wherein the section modulus may be easily varied, by varying the section thickness, and width of the columns or flexible portions without altering the strain sensitivity for axial loads of varying magnitudes.

The conventional symmetrical column type of force sensing element dos not begin to bend under an axial load until either the buckling point, or critical stress, is reached or until the average stress in the column reaches the yield point of the column material.

Accordingly, a principal object of this invention is to provide a column type of force sensing element that begins to bend immediately on the application of the slightest load and is therefore sensitive throughout the full range of loadings, i.e., from zero to the designed value of the column. A principal object of this invention also is to provide an axial force sensing balance for accurately responding only to axial forces applied thereto whereby all forces other than axial forces applied to the balance cause no axial strain therein.

Another object of this invention is to provide a column type of force sensing element that will sense in both positive and negative axial directions and in which the section strain may be easily varied by varying the thickness, width, and/or eccentricity of the column to hold a desired level of sensitivity. By a system of flexures (integral portions of the element which take out no bending energy), interactions or forces other than the axial forces being measured are reduced to a minimum.

A further object of this invention is to provide an eccentric column type of force sensing element that is adaptable for the addition and incorporation of eccentric straps for increasing the range and load sensitivity without necessitating complete redesign of the element.

A still further object of this invention is to provide an eccentric column type of force sensing element that is easy to fabricate, does not require excessively close tolerances, and accordingly is more economical to construct.

Other objects and various advantages of the disclosed eccentrically loaded column type of tension and compressive force sensing element will be apparent from the following detailed description, together with the accompanying drawings, submitted for purposes of illustration only and not intended to define the scope of the invention, reference being had for that purpose to the subjoined claims.

Briefly, this invention comprises a balance frame for transmitting axial loads to a strain sensing element mounted in the frame. The frame is generally described as an open box structure having upper and lower base plates connected at the four corners by flexure members. An anchor member extends upwardly from one base member between the corner flexure members and another extends downwardly from the other base member between the other two flexure members. The anchor members are in axial alignment to support the ends of a force sensing element.

Figure 2:
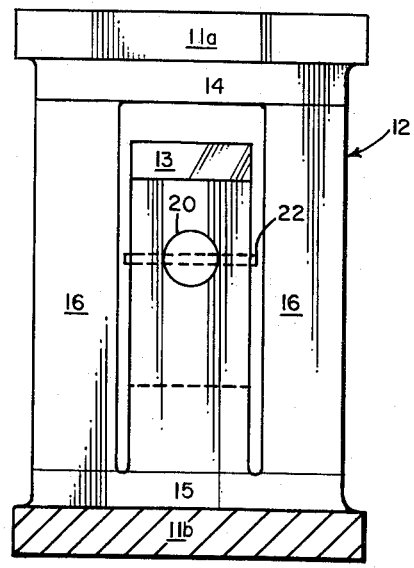
Figure 3:
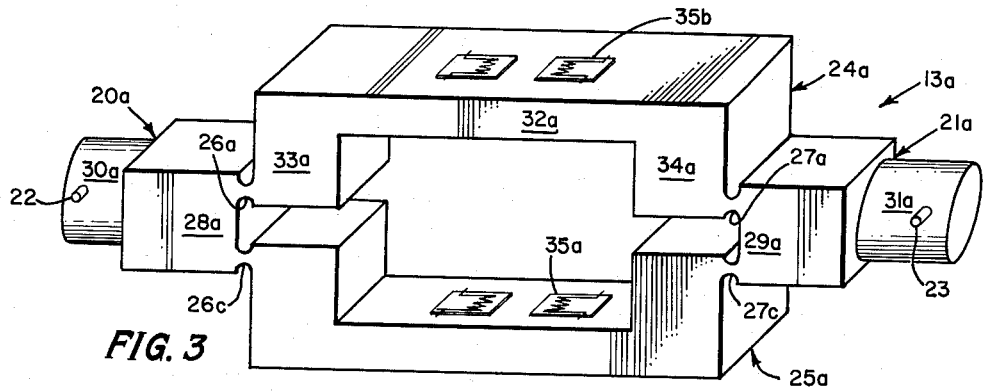
Figure 4:
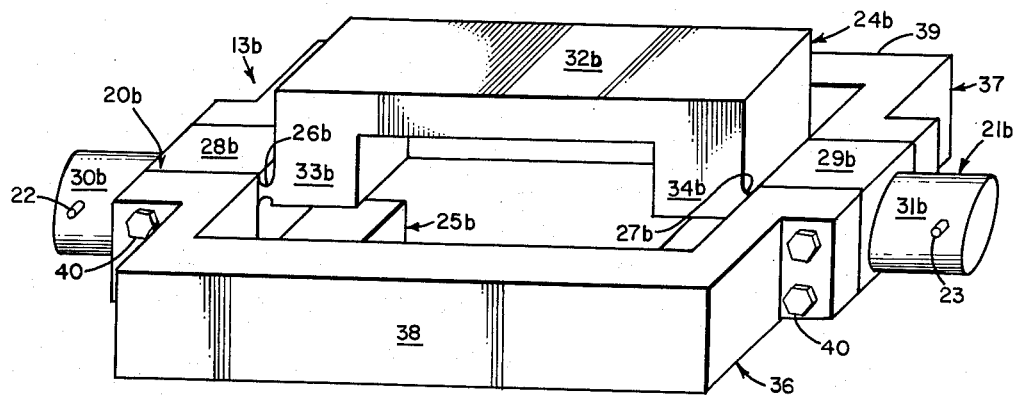
Figure 5:
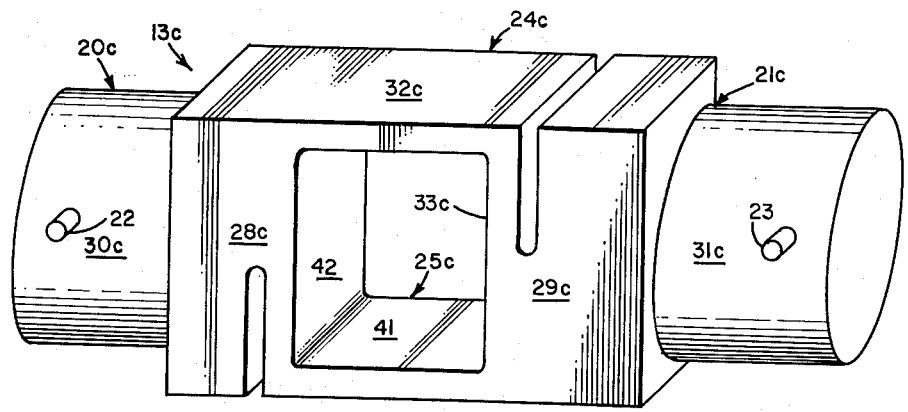

The drawings diagrammatically illustrate by way of example, not by way of limitation, three forms of the invention wherein like reference numerals designate corresponding parts in the several views in which:

FIG. 1 is a front view of a force sensing element shown mounted in a frame;
FIG. 2 is a sectional view taken at 2—2 on FIG. 1;
FIG. 3 is a perspective view of one embodiment of the force sensing element;
FIG. 4 is a perspective view of the embodiment of FIG. 3 with the application of eccentrically loaded flexure straps; and
FIG. 5 is a perspective view of another embodiment of the force sensing element.

The invention disclosed herein is not limited in its application to the method, details of construction, and arrangement of parts shown and described, since the invention is capable of other embodiments and of being practiced or carried out in various other ways. Also it is to be understood that the phraseology or terminology employed herein is for the purpose of description and not of limitation.

FIGS. 1 and 2 disclose a beam balance 12 of open box-type configuration having upper and lower base plates 14 and 15 adapted to be fixedly secured to beam ends 11a and 11b, respectively. The base plates 14 and 15 are connected at the four corners by upright members 16 and 17 which act as flexures on shear applications, while resisting normal forces, torques or rolling moment and side forces. An anchor member 18 integral with base plate 15 extends upwardly between the pair of flexures 16, while a similar anchor member 19 integral with base plate 14 extends downwardly between the pair of flexures 17. Anchor members 18 and 19 are in axial alignment to receive, as in suitable apertures, the end supports 20 and 21, respectively, of a strain sensing element comprising an eccentric column 13 with strain sensing means secured thereto. Pins 22 and 23 extend through suitable apertures in anchor members 18 and 19 and through end supports 20 and 21 to secure the end supports to the anchor members.

FIG. 3 discloses more details of a force sensing element 13a per se, wherein two allochiral or similar eccentric strain sensing columns 24a and 25a each have flexible axial portions extending parallel to the direction of the forces and integral with transverse portions extending transvesely to the forces. These latter portions are integral with the flexures 26a and 27a, respectively, of the respective end supports 20a and 21a. If so desired, the end supports 20a and 21a may be formed in shapes other than the rectangular ones shown.

Likewise, eccentric column 25a is connected to the end support 20a and 21a by the sole flexure structures 26c and 27c.

The disclosed invention comprises two true eccentric columns with the column ends connected to the end supports through flexures 26 and 27, which flexures are the equivalent to pins which provide the effect of "pinned" ends by virtue of the independent flexure arrangement and the complete separation of one column with respect to the other. Thus by virtue of the end conditions being effectively pinned, the measuring portion of the beam is much more sensitive to axial loads. The column with pinned ends has no inflection point, thus strain throughout the column may be analyzed directly by Euler's formula with a high degree of accuracy. The specific problem faced by the desirability of such an axial force sensing unit is not the load carrying capacity but the load sensitivity. The column with "pinned" ends (free to rotate and not fixed) such as disclosed herein enables maximum sensitivity at the measuring points. The disclosed invention accordingly comprises two wholly independent columns with effective end conditions allowing freedom of rotation of the columns.

A preferred connecting means between the force sensing element and the beam balance is the use of magnets. This sensing element would be an axial force sensing unit including magnets secured to end supports 20a and 21a for adhering to the beam balance, for use in the field such as on bridges, strructural steel frames, etc., if so desired. This magnetic means of attachment also may be utilized on each of the embodiments disclosed hereinafter. End support 20a comprises a prism shaped portion 28a integral with the flexures 26a and 26c and an end or connecting portion 30a for attaching the force sensing element to a frame, as frame 12, FIG. 1, for example. End support 21a comprises portions 29a and 31a similar to the above-described portions 28a and 30a, respectively.

Any conventional means, such as pins 22 and 23 in the connecting end portions of the measuring elements may be utilized for securing each of the elements to a frame for the transmission of the axial forces to be measured.

Since both of the eccentric columns 24a and 25a are similar or allochiral columns, only one is described. The eccentric column 24a consists of an axial column flexible portion 32a having a transverse portion 33a integral with the left end of the column portion as seen in FIG. 3 and another transverse portion 34a integral with the right end of the column. Suitable strain sensing means such as wire wound strain gages 35a and 35b, as the model SR–4 manufactured by Baldwin-Lima-Hamilton Corp., Waltham, Massachusetts, are secured to the axial portion 32a of each eccentric column for forming the force sensing element for supplying strain information to well known circuits for measuring the strain and accordingly the tensive or compressive axial force being exerted between the two connecting end portions 30a and 31a.

Allochiral column 25a comprises portions similar to those of column 24a. Moreover, each of the axial and transverse portions of the columns may be thickened or thinned to vary the sensitivity and provide a greater variety of axial load magnitudes without reaching the column material yield point.

The force sensing element 13b of FIG. 4 comprises two eccentric columns, 24b and 25b, both columns being connected to end supports 20b and 21b with the respective flexures 26b and 27b similar to those shown in FIG. 3. End support 20b comprises a prism shaped portion 28b and an integral connecting portion 30b for fastening the force sensing element 13b to a frame such as frame 12, or the like. Likewise, end support 21b comprises portions 29b and 31b similar to the portions 28b and 30b, respectively, described above. Accordingly, a detachable means is provided for varying the range of load and range of sensitivity without reaching the yield point of the material of the column and without requiring the complete redesign of the element.

Eccentric column 24b of the force sensing element 13b of FIG. 4 comprises an axial flexible column portion 32b having two transverse portions 33b and 34b integral therewith. Likewise the column flexible portion 32b is adapted for the mounting of resistance strain gages thereon. Similarly, eccentric column 25b comprises an axial flexible column portion having two integral transverse portions. Further, eccentric straps 36 and 37 having flexible portions or columns 38 and 39, respectively, are symmetrically positioned on opposite sides of the end support portions 28b and 29b and fixedly connected thereto by any conventional attachment, such as bolts 40. Accordingly, in the embodiment of FIG. 4, the range of sensitivity and of axial load magnitude may be greatly increased without reaching the material yield point in the column.

FIG. 5 discloses another modified force sensing element 13c advantageous for other applications comprising eccentric columns 24c and 25c, both having the common end supports 20c and 21c. Each end support also may comprise a portion 28c and 29c formed integral with the columns and of similar prism shape, and connecting portions 30c and 31c, respectively, for attaching the measuring element to a frame, as frame 12 shown in FIG. 1, for example.

The eccentric columns 24c and 25c are similar columns with column 24c comprising an axial flexible portion 32c and a transverse portion 33c and with column 25c comprising similar axial and transverse portions 41 and 42, respectively. In this embodiment the left end for example of the flexible portion 32c of column 24c is directly attached to or integral with the end support portion 28c of end support 20c while the right end for example of the flexible portion 32c is integral with transverse portion 33c. The latter portion is integral with or attached to the end support portion 29c of the other end support 21c. The other eccentric column 25c is positioned oppositely to the first column but with its left end being integral with the transverse portion 42 which in turn is integral with the supporting end 20c and with the right end of the column being integral with the other supporting end 21c.

Since the interactions as a result of a normal force will vary directly with the moment of the normal force acting at the geometrical center of the measuring element, each of the disclosed eccentric columns is so shaped as to reduce this interaction to zero due to the moment at the geometrical center resulting from normal loading being zero.

Since interactions due to the application of a torque about the longitudinal axis varies inversely with the longitudinal axis section modulus, the polar section modulus of the disclosed columns may be increased to accordingly reduce these interactions to a minimum and yet maintain the desired sensitivity in the force sensing element.

When measuring an axial load the small magnitudes of the interactions encountered in this design accordingly allow for a greater possibility of complete cancellation with maximum axial force sensitivity. With bridging of the resistance strain gages, a complete cancellation of all interactions is theoretically accomplished and the resistance strain gage output varies solely as a function of the axial load.

Accordingly an axial force column type element for sensing forces in both the positive and negative axial directions, i.e., both compressive and tensional forces, is disclosed that is sensitive throughout the full range of loadings being measured due to immediate bending of the column upon application of the slightest load. An eccentric column type force sensing element is disclosed comprising an eccentric column having strain sensing means attached thereto and having flexures at each end to eliminate substantially all interactions or forces other than the axial forces being sensed, which is adaptable for the addition and incorporation of eccentric straps for increasing the range and load sensitivity of the axial forces to be measured, and which is easy to fabricate, does not require close tolerances, and accordingly is more economical to construct. Also a force sensing element has been disclosed having at least one eccentric column wherein the section modulus may be easily varied by varying the thickness, width, and/or length of the column without decreasing the sensitivity for reducing interactions to a minimum.

While only three embodiments of the invention have been shown in the accompanying drawings, it will be evident that various other modifications are possible in the arrangement and construction of the disclosed eccentrically loaded column type of tension and compressive force sensing element without departing from the scope of the invention.

I claim:
1. A balance for sensing axial forces between two beams being aligned along a common axis comprising: a pair of base plates, one of said base plates being secured to an adjacent end of one of the beams and the other of said base plates being secured to an adjacent end of the other of the beams in such manner that the base plates are positioned in overlapping relationship to each other; flexure members being positioned normal to the axial forces and being connected at their opposite ends to said base plates in spaced relationship; a pair of anchor members, one fixedly secured to and extending from each of said base plates in opposed directions toward but in spaced relationship to the other base plate, the pair of anchor members being spaced apart along the common axis of the beams and being in spaced relationship to said flexure member; and an axial strain sensing element mounted between and having operative connections with said anchor members.

2. A balance as recited in claim 1 in which said axial strain sensing element comprises an eccentric column, sensing means secured to said column intermediate the ends of said column, a flexure connected to each end of said eccentric column, said flexures being the sole structures connected to said eccentric column, and an end support connected to each flexure, each of said end supports being connected to said anchor members.

3. A balance for sensing axial forces between two beams having a common axial alignment comprising: an upper and a lower base plate, said upper plate being adapted to be secured to an adjacent end of one of the beams and the lower base plate being adapted to be secured to an adjacent end of the other of said beams in such manner that the upper and lower base plates are positioned in overlapping relationship to each other; flexure members being positioned normal to the axial forces and being connected at their opposite ends to upper and lower base plates in spaced relationship; a first anchor member fixedly secured to and extending upwardly from the lower base plate in spaced relationship to the upper base plate and the flexure members; a second anchor member fixedly secured to and extending downwardly from the upper base plate in spaced relationship to the lower base plate and the flexure members; said anchor members being spaced apart along the common axis of the beams; and an axial strain sensing element mounted between and being operatively connected to said anchor members.

4. The balance as recited in claim 3 wherein the strain sensing element has end portions adapted to be supported in axially aligned apertures in said anchor members; and pin elements extending normal to the axial forces through aligned apertures in said anchor members and the end portions, whereby the axial loads are transmitted from said anchor members to said strain sensing element through said pin elements.

References Cited in the file of this patent
UNITED STATES PATENTS

| | | |
|---|---|---|
| 2,458,481 | Ruge | Jan. 4, 1949 |
| 2,582,886 | Ruge | Jan. 15, 1952 |
| 2,796,503 | Ward | June 18, 1957 |